UNITED STATES PATENT OFFICE.

FREDERIC D. HOUGHTON, OF WORCESTER, MASSACHUSETTS.

SOLUBLE CAKE FOR INSECTICIDAL AND FUNGICIDAL PURPOSES AND COMPOSITION THEREFOR.

1,231,741. Specification of Letters Patent. Patented July 3, 1917.

No Drawing. Application filed October 6, 1915. Serial No. 54,446.

*To all whom it may concern:*

Be it known that I, FREDERIC D. HOUGHTON, a citizen of the United States, residing at Worcester, in the county of Worcester and State of Massachusetts, have invented a new and useful Soluble Cake for Insecticidal and Fungicidal Purposes and Composition Therefor, of which the following is a specification.

This invention relates particularly to a lime sulfur composition for use as an insecticide, fungicide, and for spraying purposes in general. Heretofore, so far as I am aware in the lime sulfur compositions the raw materials have been mixed up wet at the time of use or shortly before, and even when made in a commercial form were difficult to prepare, the special difficulty being in getting the proper chemical strength and moreover, they involved considerable trouble on account of the mixing of the raw materials and the boiling of the lime, etc.

The principal object of this invention is to do away with all these difficulties by preparing the composition not in the form of a solution, but in the form of a solid cake which can be placed in a receptacle attached to a hose line, and which will dissolve at substantially the right rate when a stream of cold water is forced through or around it or both.

In order to secure these results I make a lime sulfur mixture of the ordinary proportions, and add a substance which will add to its alkalinity, render it more soluble when in a solid state, and permit of its solidifying from a liquid mixture. As an example, I take about 20 lbs. of stone lime, 20 lbs. of flowers of sulfur, and 50 lbs. of liquid solution of caustic soda (24 degrees Baumé) and prepare it in the following way. The lime is placed in a kettle or vat and hot water is used to start it to slake. The sulfur is pulverized to remove all lumps and is added slowly during the slaking process, and is stirred in thoroughly. Also at this period the sodium hydroxid or caustic soda is added and the mixture is boiled or allowed to boil while being stirred frequently until the particles of free sulfur practically disappear from sight and the mixture takes on a certain dark cherry red color, showing the formation of polysulfids of calcium, and also until the mixture assumes the proper consistency. This usually takes about two hours. The resulting composition is then poured into molds and allowed to harden.

The molds are preferably so made as to form cylindrical cakes, each with a longitudinal cylindrical passage through it. This is to permit the use of it in a receptacle which I have invented for that purpose, and allow the same to be attached to a hose and the water run through it so as to pass through the cake centrally and around its outside surfaces. I find that these cakes are readily soluble in this manner and are extremely convenient to manipulate and to use. The strength of the spray solution given off through the nozzle of the hose is maintained at substantially constant condition by the passing of the water both through and around the cake. Thus while one surface upon which the water acts increases in area the other decreases.

The caustic soda is added for two purposes. In the first place I find that the most satisfactory way to get the composition in such condition that it can be cast or molded into permanent hard cakes. Furthermore, it tends to bring the spray solution up to the desired chemical strength, and to keep it there. These cakes will keep in proper condition for a long time without deteriorating if kept from the air, and are found to have the proper solubility for the purposes intended. I find also that the hydroxids of potassium and the other alkaline metals produce substantially the same effects, but not in all cases in the same degree.

It will be understood furthermore that different proportions can be used. When a concentrated lime sulfur mixture is desired I prefer to use this formula: 21.6% by weight of lump lime, 43.3% sulfur, 35.1% dry caustic soda. This is mixed up dry and an equal weight of water added. Then it is boiled about two hours as before while stirring.

In addition to the above ingredients, other insecticides, fungicides, poisons, etc., can be added when the wash or solution is to be used for special purposes. For example the "Oregon wash" can be made according to this recipe; 16 vols. sulfur, 16 vols. lime, 4 vols. copper sulfate, 8 vols. caustic soda. In all these cases the cake is substantially permanent, readily soluble in cold water and capable of maintaining the proper strength while being dissolved by a stream of water from a hose under ordinary pressures.

It will be understood that this invention can be applied to lime sulfur compositions of all proportions and that other ingredients can be added without departing from the scope of the invention as expressed in the claims. Therefore, I do not wish to be limited in these respects, but what I claim is:—

1. As an article of manufacture, a solid cast for insecticidal and fungicidal purposes capable of retaining its shape and composition in the air, soluble in water, and consisting of lime, sulfur, and a hydroxid of an alkali metal.

2. As an article of manufacture, a solid cast for insecticidal and fungicidal purposes capable of retaining its shape and composition in the air, soluble in water, and containing lime, sulfur, and caustic soda.

3. As an article of manufacture, a solid cast for insecticidal and fungicidal purposes capable of retaining its shape and composition in the air, soluble in water, composed chiefly of lime and sulfur, and having about thirty per cent. by weight of caustic soda.

4. As an article of manufacture, a solid cast for insecticidal and fungicidal purposes capable of retaining its shape and composition in the air, soluble in water, and containing about 22% by weight of lime, about 22% of sulfur, and the rest of caustic soda.

5. The method of making a solid, soluble, lime sulfur cake for insecticidal and fungicidal purposes which consists in slaking the lime with hot water, adding flowers of sulfur during the slaking process, adding caustic soda, allowing the mixture to boil and stirring until the particles of free sulfur practically disappear from sight and the mixture takes on a cherry red color, and then pouring into molds and allowing it to set.

In testimony whereof I have hereunto set my hand.

FREDERIC D. HOUGHTON.